United States Patent
Murata (10) Patent No.: US 7,178,570 B2
(45) Date of Patent: Feb. 20, 2007

(54) PNEUMATIC TIRE INCLUDING MAIN AND AUXILIARY OBLIQUE GROOVES IN AXIALLY INNER REGION OF TREAD

(75) Inventor: Takehiko Murata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 87 days.

(21) Appl. No.: 10/751,412

(22) Filed: Jan. 6, 2004

(65) Prior Publication Data

US 2004/0134582 A1    Jul. 15, 2004

(51) Int. Cl.
*B60C 11/03* (2006.01)
*B60C 11/13* (2006.01)

(52) U.S. Cl. ............ 152/209.15; 152/209.16; 152/209.18; 152/209.22; 152/209.28

(58) Field of Classification Search ........... 152/209.15, 152/209.16, 209.18, 209.22, 209.28; D12/556, D12/559

See application file for complete search history.

(56) References Cited

U.S. PATENT DOCUMENTS

| | | | | | |
|---|---|---|---|---|---|
| 4,986,324 | A | * | 1/1991 | Suzuki et al. | 152/209.28 |
| 5,154,783 | A | * | 10/1992 | Kuhr et al. | 152/209.28 |
| 5,725,700 | A | * | 3/1998 | Ichiki | 152/209.28 |
| 5,746,849 | A | * | 5/1998 | Hutson et al. | 152/209.28 |
| 6,340,040 | B1 | | 1/2002 | Ikeda | |
| 6,352,091 | B1 | * | 3/2002 | Hanya | 152/209.28 |
| 6,892,775 | B1 | * | 5/2005 | Himuro | 152/209.28 |
| 6,907,909 | B2 | * | 6/2005 | Himuro | 152/209.28 |
| 2001/0035245 | A1 | | 11/2001 | Ikeda | |
| 2002/0005238 | A1 | * | 1/2002 | Boiocchi et al. | 152/209.27 |

(Continued)

FOREIGN PATENT DOCUMENTS

EP    0997323  A2    5/2000

(Continued)

OTHER PUBLICATIONS

Patent Abstracts of Japan, 182(59) May 18, 1994 & JP 6 040215 A Feb. 15, 1994.

*Primary Examiner*—Steven D. Maki
(74) *Attorney, Agent, or Firm*—Birch, Stewart, Kolasch & Birch, LLP (57) ABSTRACT

A pneumatic tire is provided in the tread portion with circumferential grooves, main oblique grooves and auxiliary oblique grooves. The circumferential grooves include: a pair of axially outer grooves disposed one on each side of the tire equator; and at least one axially inner groove between the axially outer grooves, so as to divide the tread portion into at least four circumferential regions including: a pair of axially inner regions between the axially outer grooves and said at least one axially inner groove; and a pair of axially outer regions axially outside the axially outer grooves. The axially inner regions have an axial width L1 of from 0.15 to 0.25 times the critical tread width TW1. The main oblique groove extends across one of the axially inner regions so that the axially outer end is connected with the adjacent axially outer circumferential groove and the axially inner end is connected with the adjacent axially inner groove. The main oblique groove has an inclination angle θ1 of from 45 to 90 degrees at the axially outer end thereof, and an inclination angle θ2 at the axially inner end thereof which is less than the inclination angle θ1, when measured with respect to the tire circumferential direction. The auxiliary oblique grooves are arranged alternately with the main oblique grooves, and each extends from the adjacent axially outer circumferential groove to one of the axially adjacent main oblique grooves.

13 Claims, 6 Drawing Sheets

FOREIGN PATENT DOCUMENTS

| | | | |
|---|---|---|---|
| EP | 1 106 395 A2 | | 6/2001 |
| GB | 1549347 | * | 8/1979 |
| JP | 63-90405 | * | 4/1988 |
| JP | 2-141310 | * | 5/1990 |
| JP | 2886540 B2 | | 2/1999 |
| JP | 2001-71709 | * | 3/2001 |
| JP | 2001-225611 A | | 8/2001 |

* cited by examiner

PNEUMATIC TIRE INCLUDING MAIN AND AUXILIARY OBLIQUE GROOVES IN AXIALLY INNER REGION OF TREAD

This Non-provisional application claims priority under 35 U.S.C. § 119(a) on Patent Application No(s). 2003-001338 filed in Japan on Jan. 7, 2003, the entire contents of which are hereby incorporated by reference.

The present invention relates to a pneumatic tire, more particularly to a tread pattern suitable for high performance tire being capable of improving critical grip and traction.

During high speed running including cornering and straight running, tire grip on dry and wet roads is very important for safety driving. Further, in case of motor racing, traction in a transient state from cornering to straight running is an important factor for high speed driving as well as safety driving.

AS well known in the tire art, enlarging of the ground contacting area of a tire may improve grip on dry roads, and widening of tread grooves or increasing of the grooved area may improve grip on wet roads, thus the wet grip and dry grip are most commonly accepted as antinomic requirements because the widening of the tread grooves inevitably leads to a decrease in the ground contacting area more or less. For tire designers and motor racing people, therefore, it is a common practice to search for a compromise therebetween in accordance with the intended use of the tire and racing conditions.

When a tire resists against the maximum sideforce at the time of for example critical cornering in motor racing, as the tire expends its almost all grip on the sideforce, there is no margin of the grip which can serve for traction. Therefore, when the running state is changed from critical cornering to straight running, full acceleration is desirable but difficult because the tire loses necessary grip by the increased traction component. As a countermeasure therefor, increasing of the tire grip overall is conceivable, but it is very difficult without sacrificing the drainage performance because grip has usually already leached to its limit.

Therefore, in the search of room for improvement, the present inventor made various studies on relationship among the critical grip, tread pattern, tire deformation during critical running and so on, and found that the grip in a specific direction which is of the vector sum of a sideforce and a traction can be effectively increased by specifically defining the positions, sizes, shapes of tread elements in relation to the ground contacting region under a specific loaded condition, and then, the present invention was accomplished.

It is therefore, an object of the present invention to provide a pneumatic tire, in which the critical traction and grip can be effectively improved without sacrificing wet performance and especially tire grip in the sideforce direction.

According to the present invention, a pneumatic tire comprises a tread portion provided with circumferential grooves, main oblique grooves and auxiliary oblique grooves, the circumferential grooves including a pair of axially outer grooves disposed one on each side of the tire equator and at least one axially inner groove between the axially outer grooves, so as to divide the tread portion into at least four circumferential regions including a pair of axially inner regions between the axially outer grooves and the at least one axially inner groove and a pair of axially outer regions axially outside the axially outer grooves, the main oblique grooves each extending across one of the axially inner regions so that the axially outer end is connected with the adjacent axially outer circumferential groove and the axially inner end is connected with the adjacent axially inner groove, the auxiliary oblique grooves arranged alternately with the main oblique grooves in the circumferential direction of the tire, and each extending from the adjacent axially outer circumferential groove to one of the axially adjacent main oblique grooves, the axially inner regions each having an axial width L1 of from 0.15 to 0.25 times the critical tread width Tw1, and the main oblique grooves each having an inclination angle θ1 of from 45 to 90 degrees at the axially outer end thereof, and an inclination angle θ2 at the axially inner end thereof which is less than the inclination angle θ1, when measured with respect to the tire circumferential direction.

Definitions of Terms

Figure 7:
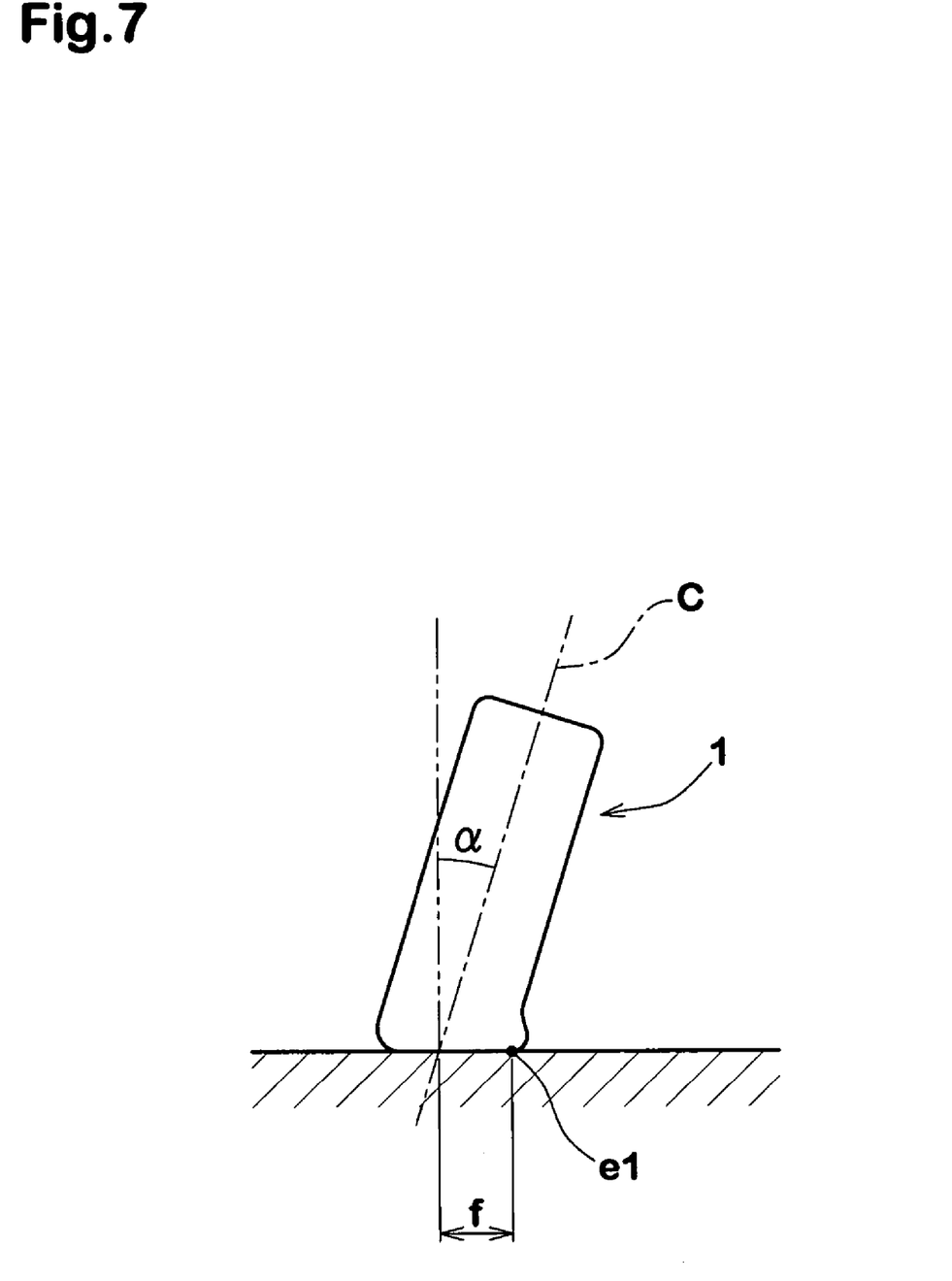
FIG. 7 is a schematic view of a tire for explaining the critical tread width.

In this specification, the "critical tread edge (e1)" is, as shown in FIG. 7, defined as the axially farthest edge of the ground contacting region of the tire (namely, the edge on the same side as the inclining direction) when the tire mounted on a standard rim and inflated to a standard pressure is loaded with a standard tire load and inclined at a camber angle alpha of 4 degrees on a flat road surface. The edge (e1) is defined on each side of the tire.

The "normal tread edges (e2)" are defined as the axially outermost edges of the ground contacting region of the tire when the camber angle alpha is set at 0 degree.

The "critical tread width TW1" is defined as an axial distance between the critical tread edges (e1), namely, 2 times the distance between the critical tread edge (e1) and the tire equator C, measured under the normally inflated unloaded condition where the tire is mounted on the standard rim and inflated to the standard pressure but loaded with no tire load. The "normal tread width TW2" is defined as the axial distance between the normal tread edges (e2) under the normally inflated unloaded condition.

Here, the above-mentioned standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

During cornering or turning, if the centrifugal force becomes larger than the cornering force, the tire will cause sideslip. The undermentioned "critical grip running" means the running state where the tire is on the threshold of causing sideslip and the tire does not yet lose its grip on the road.

Embodiments of the present invention will now be described in detail in conjunction with the accompanying drawings.

In the drawings, pneumatic tire according to the present invention is a radial tire for sports cars comprising a tread portion 2, a pair of sidewall portions, a pair of axially spaced bead portions each with a bead core therein, a radial carcass ply, a tread reinforcing belt and the like.

Figure 1:
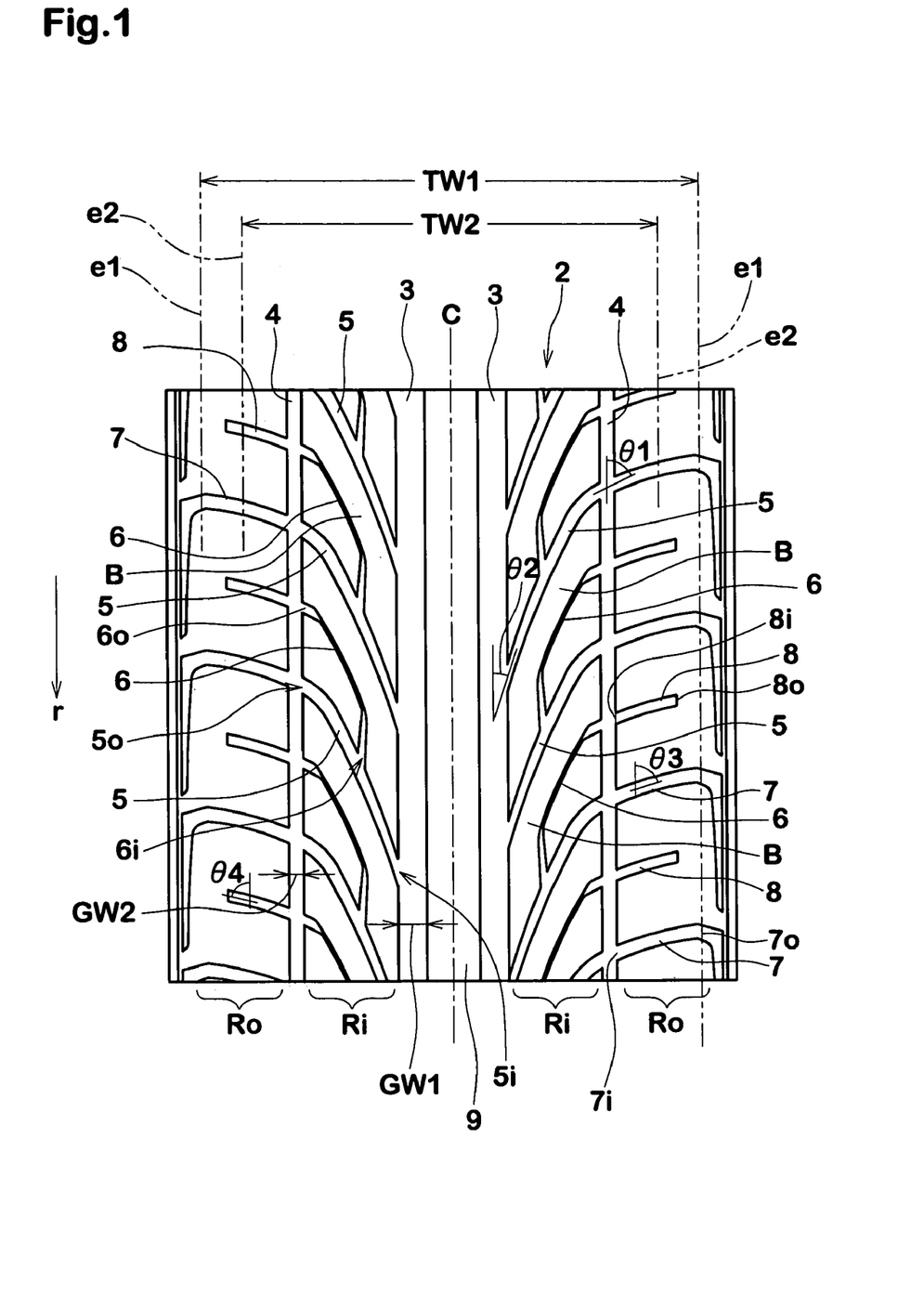
FIG. 1 is a developed partial view of the tread portion of a pneumatic tire according to the present invention showing an example of the tread pattern.

The tread portion 2 is provided with: an axially inner, circumferentially continuously extending circumferential groove 3 disposed on each side of the tire equator C; and an axially outer, circumferentially continuously extending circumferential grooves 4 disposed axially outside the axially inner circumferential groove 3 so as to divide the tread portion 2 into a pair of axially inner circumferential regions Ri between the circumferential grooves 3 and 4, and a pair of axially outer circumferential regions Ro axially outside the outer circumferential grooves 4.

In this embodiment, the circumferential grooves 3 and 4 on one side of the tire equator C are disposed substantially symmetrical positions about the tire equator C with respect to those on the other side of the tire equator C.

Although it is possible to use zigzag grooves only or in combination with straight grooves, the circumferential grooves 3 and 4 in this example are formed as straight grooves to educe the maximum drainage performance with the minimum grooved area to increase the ground contacting area.

In this embodiment, provided as a circumferential groove for drainage purpose, namely, a groove having a substantial width are only the inner and outer circumferential grooves 3 and 4 to improve the tread pattern rigidity and thereby steering stability. In order to further increase the tread pattern rigidity, it may be possible to reduce the axially inner grooves 3 to a single relatively wide circumferential groove 3.

The groove widths GW1 and GW2 of the circumferential grooves 3 and 4, respectively, are preferably set in the range of from 2 to 7% of the critical tread width Tw1.

If the widths GW1 and GW2 are less than 2% of TW1, it is difficult to provide necessary drainage. If the groove widths GW1 and GW2 are more than 7% of Tw1, the pattern rigidity decreases, and the steering stability, especially critical running performance are liable to deteriorate.

In this embodiment, the width GW1 of the axially inner circumferential grooves 3 is more than the width GW2 of the axially outer circumferential grooves 4. Preferably, the width GW1 is set in the range of from 5 to 7% of the critical tread width Tw1, and the width GW2 is set in the range of from 2 to 4% of the critical tread width Tw1.

Therefore, as the tread shoulder maintains high rigidity, critical cornering performance may be improved while maintaining an improved water discharge from the tread center in straight running. Further, as the circumferential grooves 3 and 4 are straight, in view of reduction of tire noise due to resonance of air in the circumferential grooves in the ground contacting patch, it is effectual that the axially outer grooves 4 are formed in a narrower width.

The above-mentioned axially inner circumferential region Ri has an axial width L1 in the range of from 0.15 to 0.25 times, preferably 0.15 to 0.20 times the critical tread width Tw1. If the width L1 is less than 0.15 times the width Tw1, the axially inner circumferential regions Ri decrease in the lateral stiffness (rigidity) and it becomes difficult to produce a large cornering force. If the width L1 is more than 0.25 times the width Tw1, the axially outer circumferential regions Ro becomes narrow, and uneven wear and a deterioration of the steering stability are liable to arise.

The axially outer circumferential region Ro has an axial width L2 of not less than 0.1 times, preferably more than 0.13 times but not more than 0.3 times, preferably less than 0.2 times the critical tread width TW1, wherein the axial width L2 is defined between the critical tread edge (e1) and the axially outer edge of the axially outer circumferential groove 4.

The central circumferential region 9 has an axial width L3 of not less than 0.09 times, preferably more than 0.1 times, but not more than 0.13 times the critical tread width TW1.

The central circumferential region 9 is not provided with a groove extending across its entire width L3.

In this example, the central region 9 is not provided with any groove, and thus, a circumferentially continuously extending rib is formed.

The axially inner circumferential regions Ri are each provided with a plurality of main oblique grooves 5 at irregular intervals or variable pitches in the tire circumferential direction. The axial outer end 5o of the main oblique groove 5 is connected with the axially outer circumferential groove 4, and the axial inner end 5i is connected with the axially inner circumferential groove 3, whereby each of the axially inner circumferential regions Ri is circumferentially divided into a row of circumferentially arranged blocks B of a substantially parallelogram in this example.

Figure 2:
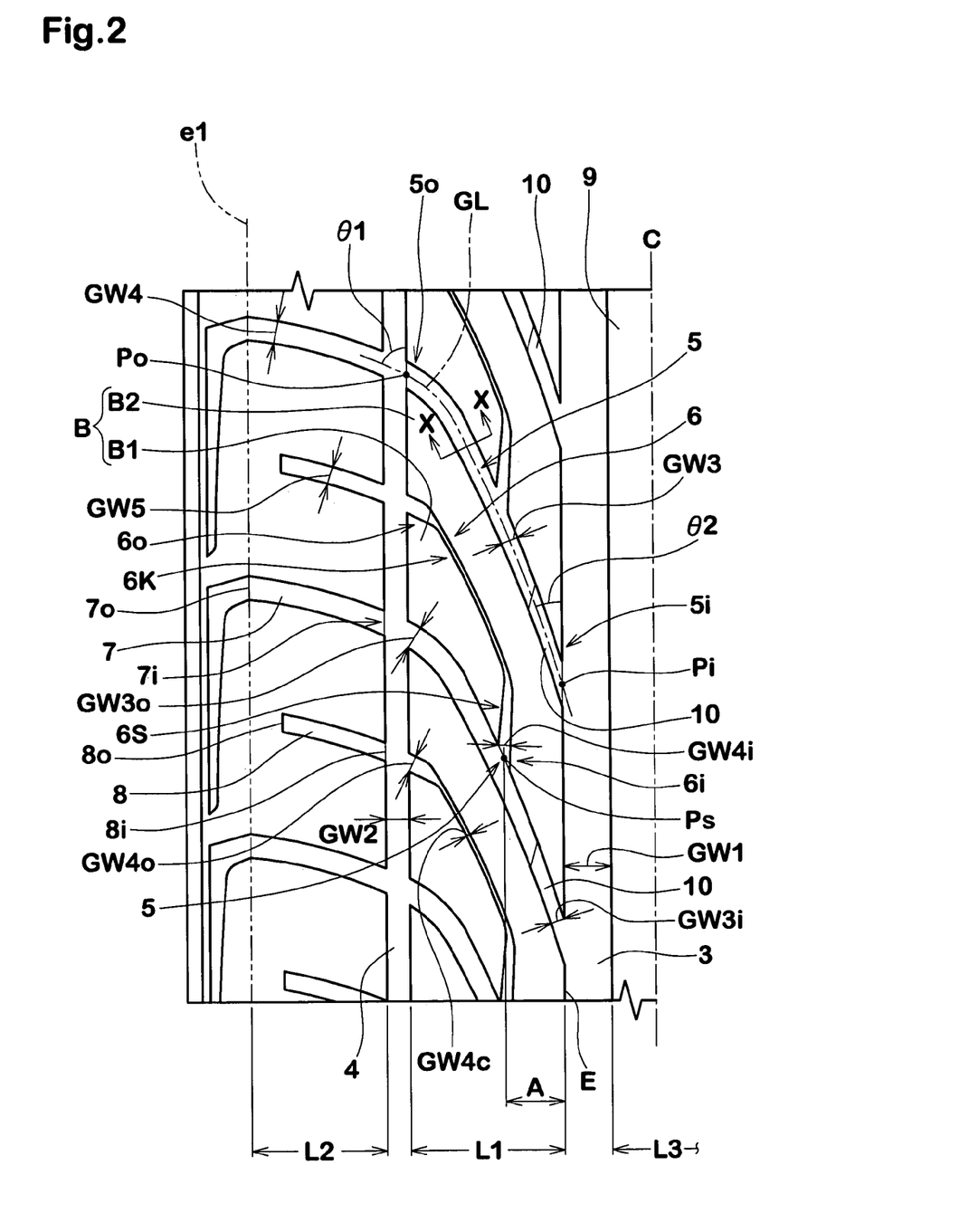
FIG. 2 is an enlarged view showing a right half thereof.

The inclination angle θ of the main oblique groove 5 is set as follows: the angle θ1 at the outer end 5o is not less than 45 degrees, preferably more than 60 degrees but not more than 90 degrees, preferably less than 80 degrees; and the angle θ2 at the inner end 5i is less than the inclination angle θ1 and preferably not less than 10 degrees, more preferably more than 20 degrees but preferably not more than 45 degrees, more preferably less than 35 degrees with respect to the tire circumferential direction of the tire. Here, the inclination angle θ is defined as of the tangent to the groove center line GL as shown in FIG. 2.

During critical grip running, high lateral stiffness (rigidity) is required in the vicinity of the outer end 5o of the main oblique groove 5. Therefore, to improve the critical grip running performance, a large inclination angle θ1 is provided to obtain high lateral stiffness (rigidity).

In the vicinity of the inner end 5i, on the other hand, in order to effectively remove water from the tread center, the inclination angle θ2 is decreased so that water is easily led into the main oblique grooves 5 and discharged therethrough to the axially outside of the tire.

The main oblique groove 5 in this example extends long from the inner end 5i substantially straightly, namely, at the substantially constant angle θ2, and then near the outer end 5o, the inclination angle changes to θ1 from θ2. The angle change is continuous and smooth to decrease the water flow resistance and thereby to improve the drainage performance.

From the point of view of tread pattern rigidity, the main oblique groove 5 is provided with a width of not less than 10%, preferably more than 20%, more preferably more than 30%, but not more than 70%, preferably less than 60%, more preferably less than 50% of the width GW1 of the axially inner circumferential grooves 3, and a depth of not less than 70%, preferably more than 80%, but not more than 95%, preferably less than 90% of the axially inner circumferential grooves 3.

In this specification, the groove widths are measured perpendicularly to the groove center lines as shown in FIG. 2 unless otherwise noted.

As to the width GW3 of the main oblique groove 5 in this embodiment, the width GW3o at the outer end 5o is more than the width GW3i at the inner end 5i. Preferably, the width GW3o is set in the range of from 1.2 to 1.8 times the width GW3i to secure the rigidity of the blocks B on the inner end 5i side while reserving a sufficient groove volume to maintain the drainage performance In each portion between the circumferentially adjacent main oblique grooves 5, one auxiliary oblique groove 6 is disposed.

The auxiliary oblique groove 6 has an axial outer end 6o connected with the axially outer circumferential groove 4 and extends therefrom towards the tire equator c in almost parallel to the main oblique grooves 5, and in the middle of the course of the main oblique groove 5, the auxiliary oblique groove 6 turns towards one of the main oblique grooves 5 on the same side as the inclining direction thereof to extend circumferentially, and the axial inner end 6i thereof is connected with the main oblique groove 5, whereby the water drainage can be improved while the rigidity of the block B is maintained on the axially inner side of the blocks B.

AS the auxiliary oblique groove 6 are not extended to the axially inner circumferential grooves 3, the axially inner circumferential regions Ri is improved in the circumferential rigidity. Thus, a larger driving force (traction) may be obtained. On the other hand, as the auxiliary oblique groove 6 has an oblique part 6k, the lateral stiffness (rigidity) against the cornering force is maintained in the axially outer part and the steering stability may be improved during cornering.

From this viewpoint, it is preferable that a junction point Ps of the inner end 6i to the main oblique groove 5 is axially outwardly spaced apart from the axially outer edge E of the axially inner circumferential groove 3 by a distance (A) of not less than 20%, preferably more than 25%, more preferably more than 30%, but not more than 70%, preferably lees than 50%, more preferably lees than 40% of the axial width L1 of the axially inner circumferential regions Ri.

If the distance (A) is less than 20% of the width L1, the block rigidity is liable to become insufficient. If the distance (A) is more than 70%, the efficiency of water removal from the tread center is liable to decrease. On the other hand, the outer end 6o of the auxiliary oblique groove 6 is located at a middle position between the outer ends 5o of the main oblique grooves 5.

As shown, for example, in FIG. 2, the width of the auxiliary oblique groove 6 gradually increases from a narrow middle portion thereof to wide end portions. The auxiliary oblique groove 6 in this embodiment is composed of wide end portions 6o and 6s and a narrower middle portion 6k extending therebetween substantially in parallel with the main oblique grooves 5. The groove widths GW4o and GW4i at the outer end and inner end are larger than the groove width GW4c in the middle part. It is preferable that the groove width GW4c is not more than 3.0 mm, more preferably less than 2.0 mm but more than 0.5 mm.

By the auxiliary oblique groove 6, the block B is subdivided into: a generally L-shaped wide element B2 extending from the axially outer groove 4 to the axially inner groove 3; and a generally parallelogram narrow element B1 extending from the axially outer groove 4 to a middle point between the grooves 3 and 4. But, due to the existence of the narrow width oblique part 6k whose groove top opening may close during critical grip running, the two separate elements B1 and B2 act as one united body, and a large cornering force may be produced to improve the critical performance.

Figure 3:
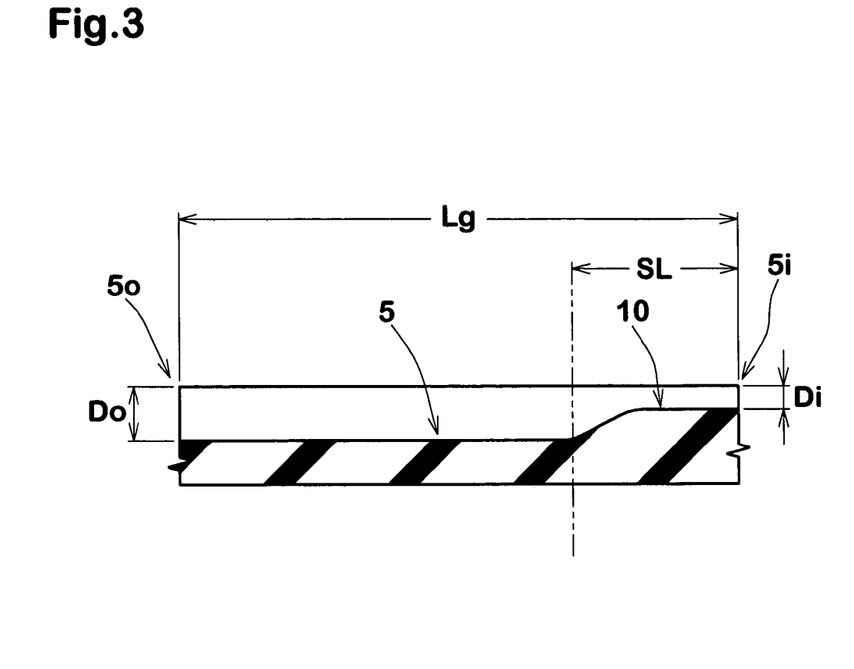
FIG. 3 is a cross sectional view of a main oblique groove taken along the groove center line GL.

FIG. 3 shows the cross sectional view of the main oblique groove 5 taken along the groove center line GL. The main oblique groove 5 is provided with a shallow part 10 in the axially inner end portion, and the depth Di at the axially inner end 5i is less than the depth Do at the outer end 5o. The shallow part 10 extends from the axially inner end 5i for a length SL of not less than 10%, preferably more than 15%, but not more than 30%, preferably less than 25% of the length Lg of the main oblique groove 5 between the ends Pi and Po, each length measured along the groove center line GL. In the shallow part 10, the minimum depth Di is preferably in the range of 30 to 60% of the groove depth Do. At the outer end 5o, the groove depth Do is preferably in the range of from 5 to 8 mm.

The shallow part 10 provides a lateral support for the tapered or pointed end part of the block B. Therefore, the uneven wear resistance and the critical running performance can be improved as the movement of this pointed part is controlled and the apparent rigidity is increased.

The above-mentioned axially outer circumferential regions Ro are provided with alternate oblique shoulder grooves 7 and auxiliary shoulder grooves 8.

In this example, the oblique shoulder grooves 7 are each formed like an extension of one of the main oblique grooves 5 towards the tread edge. Thus, the axial inner end 7i thereof is aligned, on the course of the main oblique groove 5, with the outer end 5o of the main oblique groove 5, across the axially outer circumferential groove 4. And the inclining direction is the same as that of the main oblique groove 5. The oblique shoulder groove 7 is extended to or axially outwardly of the critical tread edge (e1).

To avoid decrease in the lateral stiffness (rigidity) of the axially outer circumferential regions Ro and improve the grip performance during cornering, the inclination angle $\theta 3$ of the oblique shoulder groove 7 is preferably set in a range of not less than 60 degrees, preferably more than 70 degrees, but not more than 90 degrees, preferably less than 80 degrees. The groove width GW4 is preferably set in the range of not less than 0.2%, preferably more than 0.25%, but not more than 0.5%, preferably less than 0.4% of the critical tread width TW1.

Similarly, the auxiliary shoulder grooves 8 are each formed like an extension of one of the auxiliary oblique grooves 6 towards the tread edge. Thus, the axial inner end 8i thereof is aligned with the outer end 6o of the auxiliary oblique groove 6 across the axially outer circumferential groove 4.

But contrary to the oblique shoulder groove 7, the auxiliary shoulder groove 8 terminates between the critical tread edge (e1) and the axially inner normal tread edge (e2).

In this example, the inclination angle $\theta 4$ of the auxiliary shoulder groove 8 is the same as the inclination angle $\theta 3$ of the oblique shoulder groove 7, and the auxiliary shoulder grooves 8 and oblique shoulder grooves 7 are parallel with each other. The groove width GW5 of the auxiliary shoulder groove 8 is preferably set in the range of not less than 0.1%, preferably more than 0.2%, but not more than 0.4%, preferably less than 0.3% of the critical tread width TW1.

As the oblique shoulder grooves 7 and auxiliary shoulder grooves 8 extend beyond the normal tread edge (e2), good drainage performance can be obtained during normal running. During critical grip running, on the other hand, good drainage performance can be obtained by the oblique shoulder grooves 7, and at the same time, the grip performance can be improved because the auxiliary shoulder grooves 8 terminate before the critical tread edge (e1) to maintain an effective ground contacting area of the axially outer circumferential regions Ro.

By the above-mentioned tread grooves, a tread pattern is formed.

In this embodiment, as shown in FIG. 1, the tread pattern is substantially symmetrical about the tire equator c excepting that one half on one side of the tire equator C is slightly shifted from the other in the tire circumferential direction. Thus, the tread pattern is a unidirectional pattern having a designed rotational direction indicated by an arrow (r) in FIG. 1.

Figure 4:
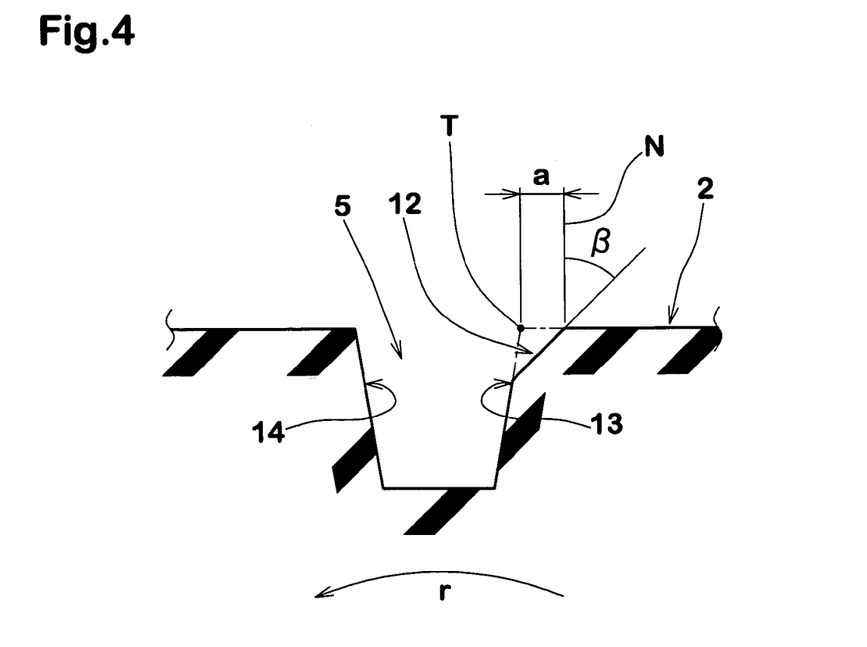
FIG. 4 is a cross sectional view of the main oblique groove taken along line X—X in FIG. 2.

In case of unidirectional tread pattern, it is preferable that, as shown in FIG. 4, the corner T between the tread face 2 and the groove wall 14 on the heel side (not the groove wall 14 on the toe side) in the rotational direction (r) is chamfered such that, in the cross section at a right angle to the groove centerline, the angle beta of the chamfer 12 is in the range of from 30 to 60 degrees with respect to a normal line to the tread surface, and the chamfer size (a) is in the range of from 0.3 to 1.5 mm. Apart from narrow grooves such as sipe (not provided in this embodiment) and the narrow part 6K of the auxiliary oblique groove 6 which are purposefully designed to close or almost close the groove top opening during running, the chamfer 12 can be provided on any groove such as the main oblique groove 5, oblique shoulder groove 7 and auxiliary shoulder groove 8 as far as the groove has circumferentially opposed groove-walls 13 and 14. By providing the chamfer 12, uneven wear of the tread block near the corner can be effectively improved. Further, the noise during normal running may be improved.

Further, the chamfer 12 may be provided on the axially inner edges of the circumferential grooves 3 and/or 4 to decrease uneven wear.

Figure 5:
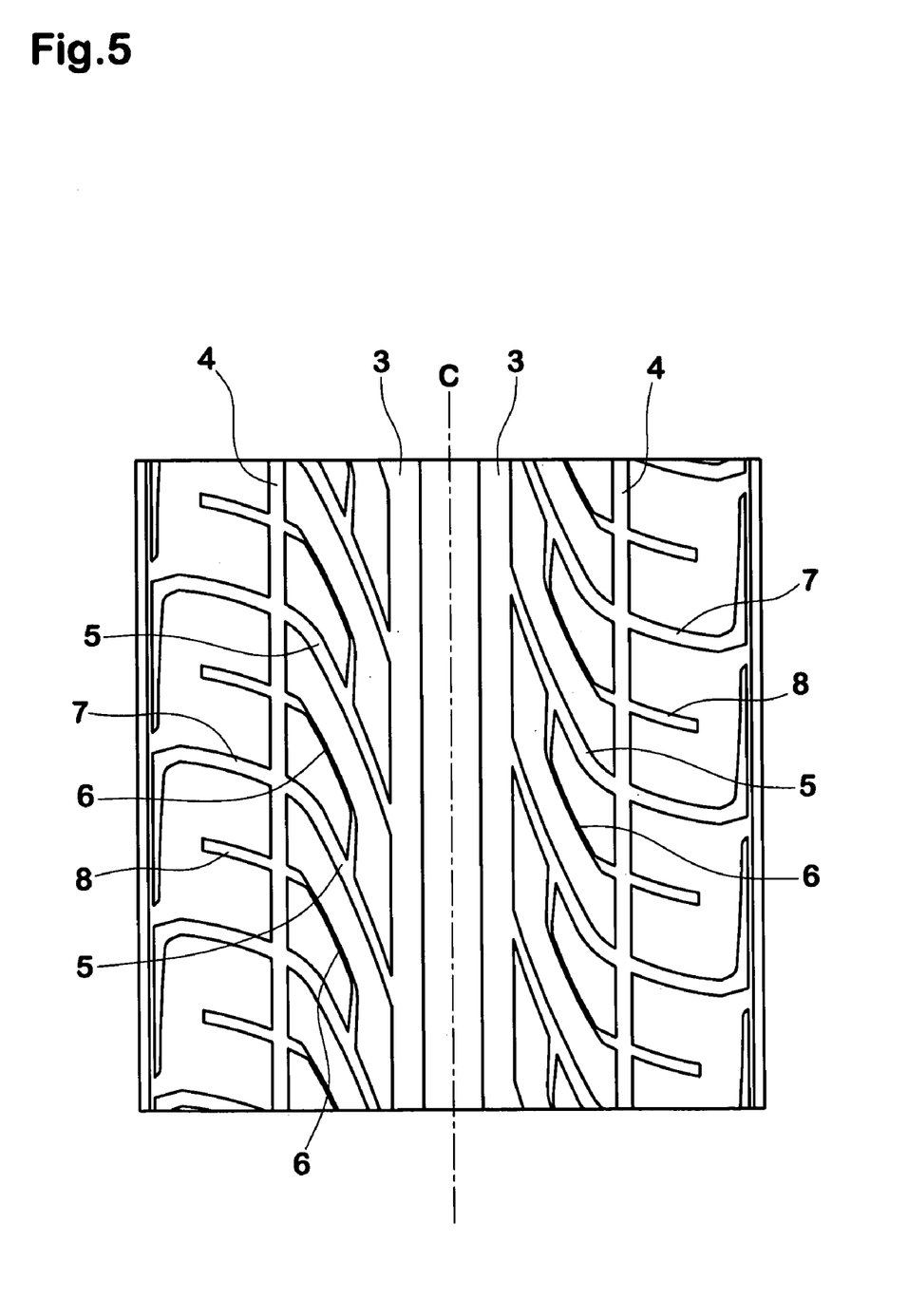
FIG. 5 shows another example of the tread pattern which is a modification of the tread pattern shown in FIG. 1 into a bidirectional tread pattern.

FIG. 5 shows a modification of the above-mentioned unidirectional tread pattern which is changed into a bidirectional tread pattern by inverting one half of the tread pattern on the right side of the tire equator, otherwise the same as the FIG. 1 pattern.

Figure 6:
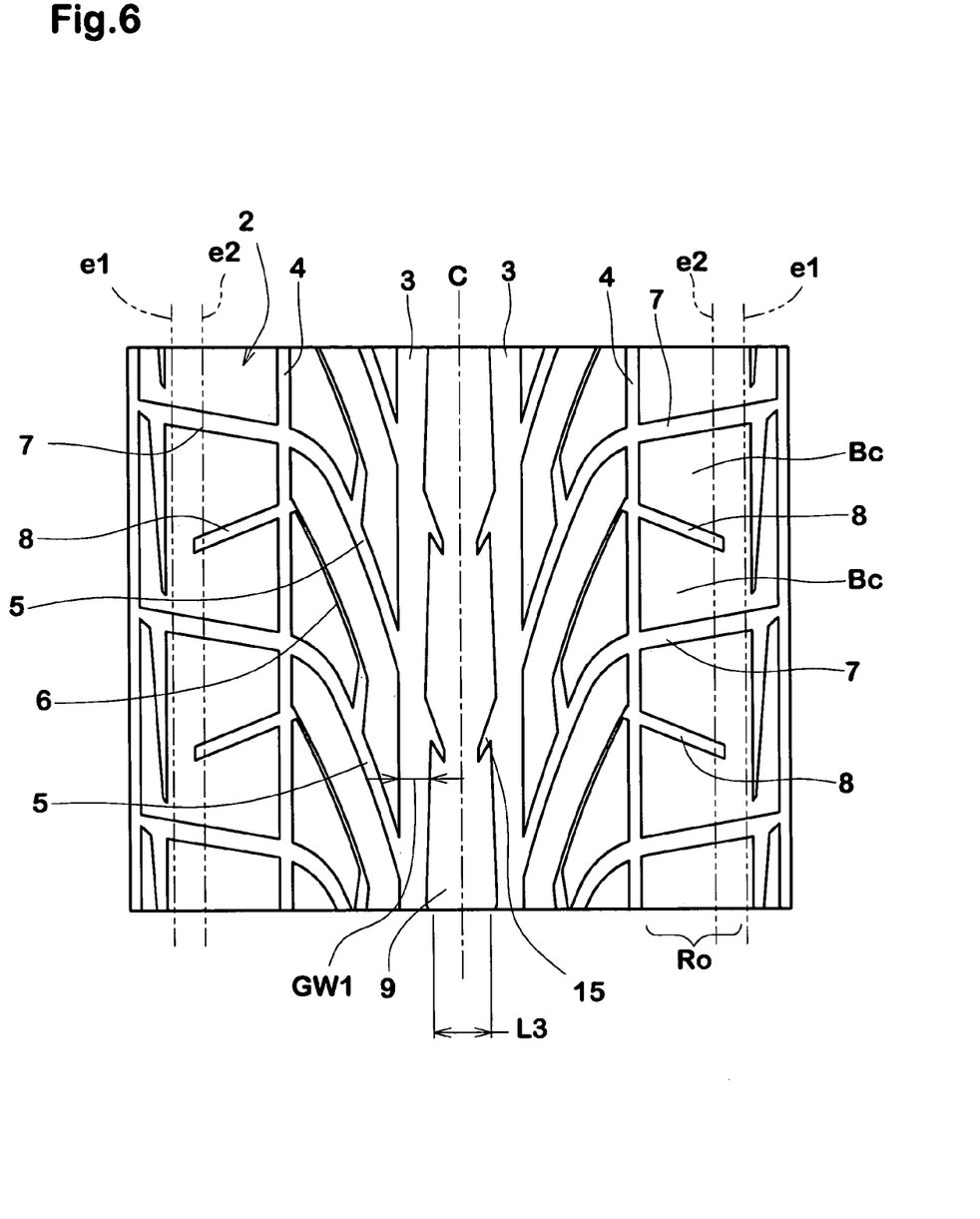
FIG. 6 shows still another example of the tread pattern.

FIG. 6 shows another example of the tread pattern for the tire according to the present invention. This example is again an unidirectional pattern. The wide difference from the former two examples is that the auxiliary shoulder grooves 8 are inclined reversely to the oblique shoulder grooves 7 in the tire circumferential direction so that the portions between the oblique shoulder grooves 7 are each divided into two oppositely oriented trapezoidal shoulder blocks Bc, whereby the block rigidity, especially against lateral force is increased to improve the critical grip running performance, and at the same time the so called pattern noise can be improved.

In this example, the auxiliary oblique grooves 6 are further modified such that the narrow part 6$k$ is extended to beside the axially outer circumferential groove 4.

The central rib 9 is provided on its both sides with notches 15 each extending for about ¼ of the width L3 and thereby terminating before the tire equator C.

To reduce the air resonance noise from the wide circumferential grooves 3, the groove width GW1 is changed periodically corresponding to the intervals of the notches 15. Specifically, the groove wall portions between the notches 15 are inclined to the same direction. Otherwise the same as the first example.

Comparison Tests

Radial tires of size 215/45R17 (rim size: 7J-17) for passenger cars having the same internal structure and the same tread pattern shown in FIG. 1 except for the parameters shown in Table 1, were made and the following comparison tests were conducted.

Drainage Performance Test:

A Japanese 2000cc FF sports car provided on the four wheels with test tires was run along a 100 meter radius circle on a wet asphalt road provided with a water pool of a 10 millimeter depth and 20 meter long, and changing the approaching speed to the water pool, the lateral acceleration (lateral G) was measured on the front wheel to obtain the average for the speed range of from 50 to 80 km/h.

Critical Traction Performance Test:

During running the test car in a test circuit course at a high speed, the driving force (traction) at the time of changing the running state from cornering to straight running was evaluated by the test driver's feeling Cornering Performance Test:

Using an indoor tire tester, cornering force was measured, and the cornering power was calculated from the measured values.

Noise Performance Test:

According to the "Test Procedure for Tire Noise" specified in Japanese JASO-c606, the test car was coasted for 50 meter distance at a speed of 60 km/h in a straight test course (asphalt road), and the maximum noise sound level in dB(A) was measured with a microphone set at 1.2 meter height from the road surface and 7.5 meter sideways from the running center line.

The results of the comparison tests are indicated in Table 1, using an index based on Ref. 1 being 100. The higher the index number, the better the performance.

From the test results, it was confirmed that the drainage performance, critical traction, cornering performance can be improve in a well balanced manner.

TABLE 1

| Tire | Ref. 1 | Ref. 2 | Ex. 1 | Ex. 2 | Ex. 3 | Ex. 4 | Ex. 5 |
|---|---|---|---|---|---|---|---|
| Tread width | | | | | | | |
| Critical TW1 (mm) | 210 | 210 | 210 | 210 | 210 | 210 | 210 |
| Normal TW2 (mm) | 200 | 200 | 200 | 200 | 200 | 200 | 200 |

TABLE 1-continued

| Tire | Ref. 1 | Ref. 2 | Ex. 1 | Ex. 2 | Ex. 3 | Ex. 4 | Ex. 5 |
|---|---|---|---|---|---|---|---|
| Circumferential region | | | | | | | |
| Width L1 (mm) | 30 | 40 | 38 | 41 | 40 | 40 | 40 |
| Width L2 (mm) | 46 | 35 | 38 | 36 | 35 | 35 | 35 |
| Width L3 (mm) | 22 | 24 | 22 | 24 | 24 | 24 | 24 |
| Inner circum. groove | | | | | | | |
| Width GW1 (mm) | 12 | 12 | 12 | 11 | 12 | 12 | 12 |
| Depth (mm) | 8 | 8 | 8 | 8 | 8 | 8 | 8 |
| Outer circum. groove | | | | | | | |
| Width GW2 (mm) | 6 | 6 | 6 | 5 | 6 | 6 | 6 |
| Depth (mm) | 7 | 7 | 7 | 7 | 7 | 7 | 7 |
| Main oblique groove | | | | | | | |
| Width GW3 (mm) | 5 | 5 | 5 | 5 | 6 | 4 | 5 |
| Depth Do (mm) | 7 | 7 | 7 | 7 | 7 | 7 | 7 |
| Angle θ1 (deg.) | 70 | 70 | 70 | 70 | 60 | 60 | 70 |
| Angle θ2 (deg.) | 20 | 20 | 20 | 20 | 10 | 10 | 20 |
| Chamfer 12 provided? | yes | yes | yes | yes | yes | yes | no |
| Shallow part provided? | yes | yes | yes | yes | yes | yes | yes |
| Auxiliary oblique groove | | | | | | | |
| Width GW4 (mm) | 6 | 6 | 6 | 6 | 7 | 5 | 6 |
| Depth (mm) | 6 | 6 | 6 | 6 | 6 | 6 | 6 |
| Distance (A)/L1 (%) | 35 | 0 | 35 | 35 | 35 | 35 | 35 |
| Oblique shoulder groove | | | | | | | |
| Width (mm) | 7 | 7 | 7 | 7 | 8 | 6 | 7 |
| Depth (mm) | 6 | 6 | 6 | 6 | 6 | 6 | 6 |
| Angle θ3 (deg.) | 80 | 80 | 80 | 80 | 70 | 70 | 80 |
| Chamfer 12 provided? | yes | yes | yes | yes | yes | yes | no |
| Auxiliary shoulder groove | | | | | | | |
| Width (mm) | 5 | 5 | 5 | 5 | 6 | 6 | 5 |
| Depth (mm) | 6 | 6 | 6 | 6 | 6 | 6 | 6 |
| Angle θ4 (deg.) | 80 | 80 | 80 | 80 | 70 | 70 | 80 |
| Chamfer 12 provided? | yes | yes | yes | yes | yes | yes | no |
| Drainage | 100 | 95 | 110 | 100 | 115 | 95 | 100 |
| Critical traction | 100 | 102 | 105 | 105 | 100 | 115 | 105 |
| Cornering power | 100 | 105 | 105 | 110 | 100 | 115 | 110 |
| Pass-by noise | 100 | 100 | 101 | 105 | 95 | 105 | 100 |

The invention claimed is:

1. A pneumatic tire comprising a tread portion provided with circumferential grooves, main oblique grooves and auxiliary oblique grooves, the circumferential grooves including a pair of axially outer grooves disposed one on each side of the tire equator and at least one axially inner groove between the axially outer grooves, so as to divide the tread portion into at least four circumferential regions including a pair of axially inner regions between the axially outer grooves and said at least one axially inner groove and a pair of axially outer regions axially outside the axially outer grooves, the main oblique grooves each extending across one of the axially inner regions so that the axially outer end is connected with the adjacent axially outer circumferential groove and the axially inner end is connected with the adjacent axially inner groove, the auxiliary oblique grooves arranged alternately with the main oblique grooves in the circumferential direction of the tire, and each said auxiliary oblique groove extending axially inwardly from the adjacent axially outer circumferential groove, while inclining towards the same circumferential direction as the main oblique grooves, to one of the axially adjacent main oblique grooves, whereby the auxiliary oblique groove is connected to said adjacent axially outer circumferential groove and said one of the axially adjacent main oblique grooves only, each said auxiliary oblique groove comprising a narrow middle portion having a groove width of more than 0.5 mm and not more than 3.0 mm and a wide end portion connecting to said one of the axially adjacent main oblique grooves while gradually increasing the width of the wide end portion from the narrow middle portion, the axially inner regions each having an axial width L1 of from 0.15 to 0.25 times the critical tread width Tw1, and the main oblique grooves each having an inclination angle θ1 of from 45 to 90 degrees at the axially outer end thereof, and an inclination angle θ2 at the axially inner end thereof which is less than the inclination angle θ1, when measured with respect to the tire circumferential direction.

2. The pneumatic tire according to claim 1, wherein the narrow middle portion is substantially parallel with the adjacent main oblique grooves.

3. The pneumatic tire according to claim 1 or 2, wherein the connecting point at the inner end of each said auxiliary oblique groove with the main oblique groove is axially outwardly spaced apart from the axially inner circumferential groove by a distance of from 20 to 70% of the axial width L1 of the axially inner region.

4. The pneumatic tire according to claim 1, wherein each said main oblique groove is provided in an axially inner end portion thereof with a shallow part which is shallower than the outer end thereof, and the length of the shallow part is in a range of from 15 to 30% of the length of the main oblique groove.

5. The pneumatic tire according to claim 1, wherein
the axially outer regions are each provided with oblique shoulder grooves and auxiliary shoulder grooves which are alternately arranged in the tire circumferential direction,
said oblique shoulder grooves extend axially outwardly from one of the axially outer circumferential grooves, while aligning their axially inner ends with the axially outer ends of the main oblique grooves, to or beyond the axial position of a critical tread edge (e1), and
said auxiliary shoulder grooves extend axially outwardly from said one of the axially outer circumferential grooves, while aligning their axially inner ends with the axially outer ends of the auxiliary oblique grooves, to an axial position before said critical tread edge (e1).

6. The pneumatic tire according to claim 5, wherein the auxiliary shoulder grooves are inclined to the same direction as the oblique shoulder grooves.

7. The pneumatic tire according to claim 5, wherein
the tread portion is provided with an unidirectional tread pattern, and
the main oblique grooves have heel-side edges chamfered and toe-side edges not chamfered.

8. The pneumatic tire according to claim 5, wherein
the tread portion is provided with an unidirectional tread pattern,
and the oblique shoulder grooves have heel-side edges chamfered and toe-side edges not chamfered.

9. The pneumatic tire according to claim 5, wherein
the tread portion is provided with an unidirectional tread pattern,
and the auxiliary shoulder grooves have heel-side edges chamfered and toe-side edges not chamfered.

10. The pneumatic tire according to claim 1, wherein the circumferential grooves have axially inner chamfered edges and axially outer edges not chamfered.

11. The pneumatic tire according to claim 1, wherein each said main oblique groove has a width (GW3, GW3o, GW3i) of not less than 10 % but not more than 70 % of the width of the axially inner circumferential groove, wherein the width GW3o at the outer end is more than the width GW3i at the inner end thereof.

12. The pneumatic tire according to claim 1, wherein each said main oblique groove has a width (GW3, GW3o, GW3i) of not less than 10 % but not more than 70 % of the width of the axially inner circumferential groove, wherein the width GW3o at the outer end is in a range of from 1.2 to 1.8 times the width GW3i at the inner end.

13. A pneumatic tire comprising a tread portion provided with circumferential grooves, main oblique grooves and auxiliary oblique grooves,
the circumferential grooves including a pair of axially outer grooves disposed one on each side of the tire equator and at least one axially inner groove between the axially outer grooves, so as to divide the tread portion into at least four circumferential regions including a pair of axially inner regions between the axially outer grooves and said at least one axially inner groove and a pair of axially outer regions axially outside the axially outer grooves,
the main oblique grooves each extending across one of the axially inner regions so that the axially outer end is connected with the adjacent axially outer circumferential groove and the axially inner end is connected with the adjacent axially inner groove,
the auxiliary oblique grooves arranged alternately with the main oblique grooves in the circumferential direction of the tire, and each extending from the adjacent axially outer circumferential groove to one of the axially adjacent main oblique grooves,
the axially inner regions each having an axial width L1 of from 0.15 to 0.25 times the critical tread width TW1, and the main oblique grooves each having an inclination angle $\theta 1$ of from 45 to 90 degrees at the axially outer end thereof, and an inclination angle $\theta 2$ at the axially inner end thereof which is less than the inclination angle $\theta 1$, when measured with respect to the tire circumferential direction, wherein
the axially outer regions are each provided with oblique shoulder grooves and auxiliary shoulder grooves which are alternately arranged in the tire circumferential direction,
said oblique shoulder grooves extend axially outwardly from one of the axially outer circumferential grooves, while aligning their axially inner ends with the axially outer ends of the main oblique grooves, to or beyond the axial position of a critical tread edge (e1), and
said auxiliary shoulder grooves extend axially outwardly from said one of the axially outer circumferential grooves, while aligning their axially inner ends with the axially outer ends of the auxiliary oblique grooves, to an axial position before said critical tread edge (e1), wherein
the auxiliary shoulder grooves are inclined oppositely to the oblique shoulder grooves.

* * * * *